July 17, 1934.  H. W. HICKLEY  1,966,980
APPARATUS FOR APPLYING COATINGS TO ARTICLES
Filed May 28, 1932  3 Sheets-Sheet 2

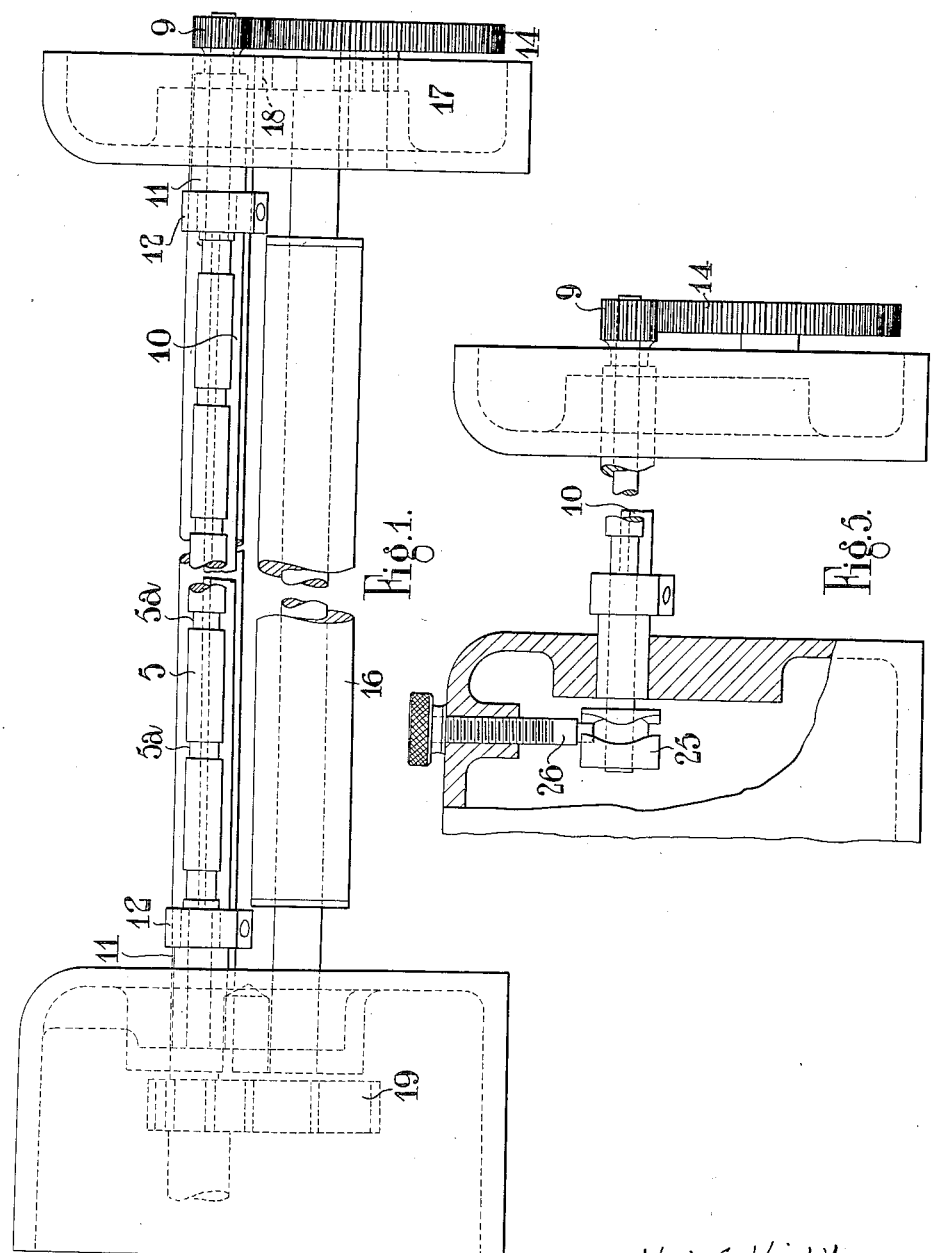

H. W. Hickley
INVENTOR

By: Marks & Clerk
Attys.

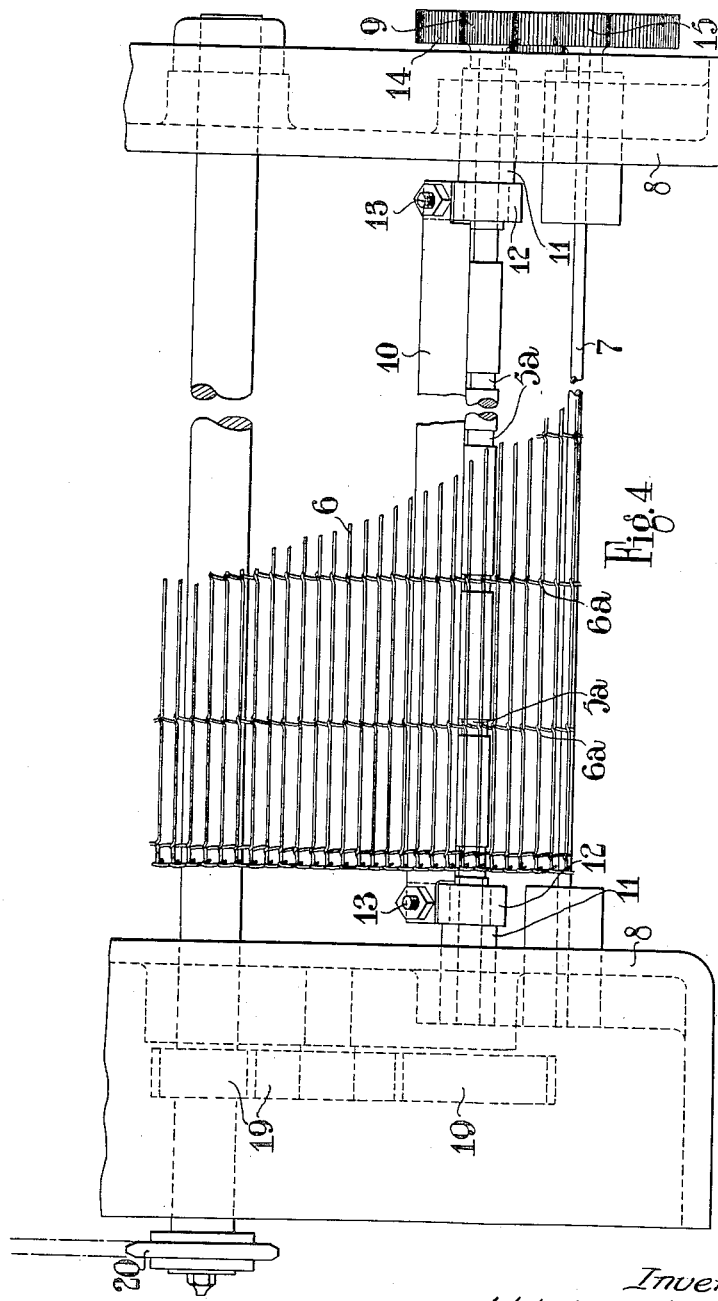

Patented July 17, 1934

1,966,980

UNITED STATES PATENT OFFICE 1,966,980

APPARATUS FOR APPLYING COATINGS TO ARTICLES

Harry William Hickley, London, England

Application May 28, 1932, Serial No. 614,192
In Great Britain June 1, 1931

3 Claims. (Cl. 91—3)

This invention relates to apparatus for applying coatings to articles and has particular reference to machines for enrobing cream or like centres with chocolate or like coatings.

In such machines the centres to be coated are conveyed on an endless wire conveyor past coating means which apply liquid chocolate to the centres, the excess coating material draining away through the wire conveyor and being collected for further use. The coated centres are delivered from the wire conveyor onto an endless travelling band while the coating is still in a plastic state.

It is well known that the coating material accumulates beneath each article so that as the latter are transferred to the receiving conveyor what are called "tails" are formed on the goods, which detracts from the appearance and quality of the articles.

A number of proposals have been made and devices built to deal with this difficulty, such being usually known as anti-tailing devices and all have been directed to the removal of the surplus chocolate, calculated to form the tail, from the goods.

It is an object of the present invention to provide improved means whereby the formation of "tails" is prevented and the tendency to denude the base of the chocolate by the excessive removal of the lower coating from which "tails" are derived is avoided.

The invention consists in the provision of means located beneath and in proximity to the wire conveyor and to the rear of the terminal guide roller thereof and adapted to cause the lower chocolate coating to be displaced relatively to the centres in a direction in which the goods are travelling with the aim in view of a removal of a certain amount of excess coating forwardly across the base of the coated centres instead of away from the rear, as has been hitherto the practice. Said means may also be arranged to cause a displacement of the coating transversely to the direction of movement of the goods.

According to one form of the invention a roller rotating at a relatively high speed in a direction (at the area of contact with the chocolate) of movement of the goods, is provided rearwardly of the terminal guide roller and is adapted to displace coating material forwardly of the base and cause any which is removed to be taken away forwardly, there being a tendency to return to the base such of the trailing coating as would normally be likely to form tails.

Means may be provided adapted to impart axial reciprocation to the roller.

Thus between the device and the centre of the article a layer of chocolate intervenes, the thickness of which is determined by the wire conveyor.

By the aid of the invention the accumulation of that part of the chocolate coating at the rear of the centres, which is calculated to form "a tail" when the goods are leaving the wire conveyor as they are transferred, is avoided.

In the accompanying drawings which illustrate the delivery end of an enrobing plant with the invention applied thereto:—

Figure 1 is an end elevation with the wire conveyor removed,

Figure 4 is a plan,

Figure 5 is an end elevation illustrating a modification.

Figure 3:
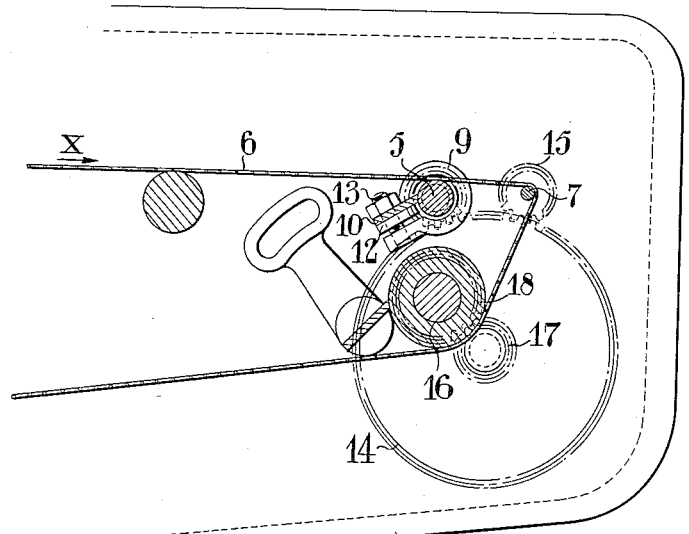
Figure 3 is a sectional elevation looking from the right in Figure 1.

In carrying the invention into effect according to one convenient mode, by way of example, the roller 5 is mounted beneath the upper run of the wire conveyor 6 and as near as convenient to the delivery end thereof, where the conveyor passes over the roll 7. The roller 5 is mounted for rotation in bearing sleeves 11 carried by the side frames 8 and at one end is provided with a gear wheel 9 by which it is driven.

The roller 5 is arranged as close as practicable to the wire conveyor. To permit this with the form of conveyor shown which has spaced knuckles 6a, the roller is provided with spaced reduced parts 5a which accommodate the knuckles as indicated in Figure 4.

The roller 5 is provided with a scraper element 10 which is mounted in straps 12 located in the reduced ends of the sleeves 11. Such scraper may be formed with spaced projecting parts engaging the reduced portions 5a of the roller 5. The scraper may be adjusted relatively to the roller by the bolts 13.

The gear wheel 9 of the roller 5 is driven by a gear 14 which also drives a pinion 15 for rotating the delivery guide roller 7 of the wire conveyor. The gear wheel 14 is driven from the lower guide roll 16 by the gears 17 and 18. The rotation of the guide roll 16 is effected through the train of gears 19 which is driven from the chain gear 20.

Figure 2:
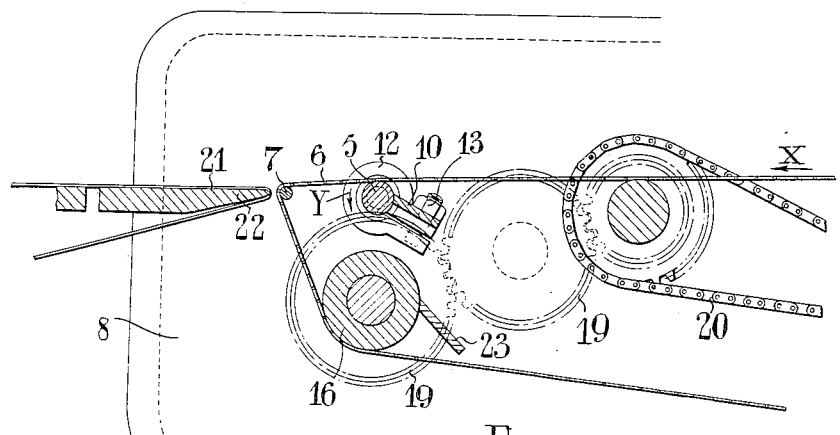
Figure 2 is a sectional elevation looking from the left of Figure 1 and showing the receiving conveyor.

It will be appreciated that the conveyor moves in the direction of the arrow X (Figure 2) and that the roller 5 rotates in the same sense as indicated by the arrow Y.

By the arrangement of gears illustrated the peripheral speed of the roller 5 will be considerably greater than the speed of travel of the wire conveyor. These relative speeds may, however, be varied according to requirements and means, such as a variable speed gear, may be provided for altering at will the speed of the roller 5.

The lower guide roller 16 is provided with an adjustable scraper element 23 for removing coating material which may be deposited thereon.

The coated goods are delivered from the wire conveyor onto an endless conveyor 21 on which they are allowed to cool and set. The conveyor 21 moves over an adjustable plate or knife 22 by which it may be adjusted relatively to the conveyor 6.

Instead of a single roller 5 as shown in the drawings, two or more rollers may be provided spaced apart which may be rotated at the same or at different speeds.

In operation, as the coated article comes into the zone of action of the rotating roll 5, the excess coating below the forward edge or portion of the article is removed by the roll in a forward direction, while as the rear portion of the article is passing over the roll, the action of the latter is to displace the coating tending to leave the centres towards the middle or forward part thereof and so to speak to redistribute the coating base. By this arrangement, between the surface of the roller and the coated centre a layer of chocolate intervenes, the thickness of which is determined by the wire conveyor.

According to the modified arrangement shown in Figure 5 the roller 5 projects through the bearing and is provided with a cam element 25 having a cam groove into which a pin 26 projects. The pin may comprise a screwed stud whereby it may be withdrawn from the cam groove.

By means of the cam and pin arrangement, as the roller 5 rotates, an axial reciprocation will be imparted to it transverse to the direction of the movement of the goods. This lateral movement of the roller, in addition to aiding in the anti-tailing action, will also ensure the spreading of the coating over the bottom of the goods. This action is particularly advantageous when relatively wide objects, such as biscuits, are being coated.

The shape of the cam groove may be varied to suit the desired amplitude and frequency of the reciprocation of the roller 5.

According to a modification, instead of a roller, an endless band may be arranged beneath the wire conveyor, the upper run of the band lying parallel to the wire conveyor, and travelling at a speed greater than the speed of the conveyor.

Having now described my invention what I claim as new and desire to secure by Letters Patent is:—

1. In apparatus for coating articles, such as cream centres, with chocolate, comprising an endless wire conveyor for conveying the articles past and away from the coating apparatus, rearward and forward terminal guide rollers for the conveyor and means for driving the conveyor, the provision of a wiping roller located beneath and against a straight part of the forwarding run of the wire conveyor and to the rear of said forward terminal roller, a scraper in contact with the wiping roller, and means adapted to rotate the wiping roller so that its upper surface against the wire conveyor travels in the same direction as the conveyor but at a peripheral speed considerably higher than the speed of the conveyor, the arrangement being such that the cleaned surface of the wiping roller displaces excess chocolate forwardly of the centres and carries away forwardly and downwardly a substantial proportion of the excess which is otherwise calculated to form tails, while the chocolate wiped off the centres by the roller is cleaned therefrom by the scraper.

2. In apparatus for coating articles, such as cream centres, with chocolate, comprising an endless wire conveyor for conveying the articles past and away from the coating apparatus, rearward and forward terminal guide rollers for the conveyor and means for driving the conveyor, the provision of a wiping roller located beneath and against a straight part of the forwarding run of the wire conveyor and to the rear of said forward terminal roller, a scraper in contact with the wiping roller, means adapted to rotate the wiping roller so that its upper surface against the wire conveyor travels in the same direction as the conveyor but at a peripheral speed considerably higher than the speed of the conveyor, and means for reciprocating the wiping roller axially, the arrangement being such that the cleaned surface of the wiping roller displaces excess chocolate forwardly and laterally of the centres and carries away forwardly and downwardly a substantial proportion of the excess which is otherwise calculated to form tails, while the chocolate wiped off the centres by the roller is cleaned therefrom by the scraper.

3. Apparatus for coating articles as claimed in claim 1, wherein the wiping roller is located above a driving roller for the conveyor, and a scraper for said driving roller for returning chocolate collecting thereon to the cholocate bath.

HARRY WILLIAM HICKLEY.